US 8,463,719 B2

United States Patent
Lyon et al.

(10) Patent No.: US 8,463,719 B2
(45) Date of Patent: Jun. 11, 2013

(54) AUDIO CLASSIFICATION FOR INFORMATION RETRIEVAL USING SPARSE FEATURES

(75) Inventors: Richard F. Lyon, Los Altos, CA (US); Martin Rehn, Stockholm (SE); Thomas Walters, Cambridge (GB); Samy Bengio, Mountain View, CA (US); Gal Chechik, Los Altos, CA (US)

(73) Assignee: Google Inc., Mountain View, CA (US)

( * ) Notice: Subject to any disclaimer, the term of this patent is extended or adjusted under 35 U.S.C. 154(b) by 615 days.

(21) Appl. No.: 12/722,437

(22) Filed: Mar. 11, 2010

(65) Prior Publication Data

US 2010/0257129 A1    Oct. 7, 2010

Related U.S. Application Data

(60) Provisional application No. 61/159,398, filed on Mar. 11, 2009.

(51) Int. Cl.
G06F 15/18    (2006.01)
(52) U.S. Cl.
USPC .......................................................... 706/12
(58) Field of Classification Search
None
See application file for complete search history.

(56) References Cited

U.S. PATENT DOCUMENTS

| 4,536,844 | A | 8/1985 | Lyon |
| 5,422,977 | A | 6/1995 | Patterson et al. |
| 5,473,759 | A | 12/1995 | Slaney et al. |
| 5,918,223 | A | 6/1999 | Blum et al. |
| 6,434,520 | B1 | 8/2002 | Kanevsky et al. |

OTHER PUBLICATIONS

Chechik et al., "Large-Scale Content Based Audio Retrieval from Text Queries", Proceeding of the 1st ACM International Conference on Multimedia Information Retrieval; Oct. 30, 2008; pp. 105-112.*
Daniel P. W. Ellis, "Prediction-driven Computational Auditory Scene Analysis", Massachusetts Institute of Technology, Jun. 1996, pp. 1-180.*
Turnbull et al., "Semantic Annotation and Retrieval of Music and Sound Effects," IEEE Transactions on Audio, Speech and Language Processing, Dec. 15, 2006, 10 pages.
Chechik et al., "Large-scale content based audio retrieval from text queries," Proceeding of the $1^{st}$ ACM International Conference on Multimedia Information Retrieval; Oct. 30, 2008; 8 pages.
International Search Report and Written Opinion mailed Jul. 12, 2010 from related International Application No. PCT/US2010/027031; 10 pages.
Rehn et al., "Sound Ranking Using Auditory Sparse-Code Representations," ICML 2009 Workshop Sparse Methods for Music Audio, Jun. 18, 2009; 3 pages.

(Continued)

Primary Examiner — Jeffrey A Gaffin
Assistant Examiner — Paulinho E Smith
(74) Attorney, Agent, or Firm — Fish & Richardson P.C.

(57) ABSTRACT

Methods, systems, and apparatus, including computer programs encoded on computer storage media, are provided for using audio features to classify audio for information retrieval. In general, one aspect of the subject matter described in this specification can be embodied in methods that include the actions of generating a collection of auditory images, each auditory image being generated from respective audio files according to an auditory model; extracting sparse features from each auditory image in the collection to generate a sparse feature vector representing the corresponding audio file; and ranking the audio files in response to a query including one or more words using the sparse feature vectors and a matching function relating sparse feature vectors to words in the query.

30 Claims, 8 Drawing Sheets

OTHER PUBLICATIONS

Slaney, Malcolm, "Semantic-Audio Retrieval," 2002 IEEE International Conference on Acoustics, Speech, and Signal Processing, Proceedings, Orlando, FL, May 13-17, 2002; 4 pages.

Sundaram et al., "Classification of Sound Clips by Two Schemes: Using Onomatopoeia and Semantic Labels," Multimedia and Expo, 2008 IEEE International Conference ON, IEEE, Piscataway, NJ, Jun. 23, 2008, 4 pages.

International Preliminary Report on Patentability mailed Sep. 22, 2011 from related International Application No. PCT/US2010/027031; 6 pages.

* cited by examiner

AUDIO CLASSIFICATION FOR INFORMATION RETRIEVAL USING SPARSE FEATURES

CROSS-REFERENCE TO RELATED APPLICATIONS

This application claims the benefit under 35 U.S.C. §119 of U.S. Provisional Application Ser. No. 61/159,398, filed on Mar. 11, 2009.

BACKGROUND

This specification relates to using audio features to classify audio for information retrieval.

Digital audio data (e.g., representing speech, music, or other sounds) can be stored in one or more audio files. The audio files can include files with only audio content (e.g., music files) as well as audio files that are associated with, or part of, other files containing other content (e.g., video files with one or more audio tracks). The audio data can include speech and music as well as other categories of sound including natural sounds (e.g., rain, wind), human emotions (e.g., screams, laughter), animal vocalization (e.g., lion roar, purring cats), or other sounds (e.g., explosions, racing cars, ringing telephone).

Different techniques can be used to represent audio data. For example, audio data can be represented with respect to intensity and time as an amplitude waveform or with respect to frequency and time as a spectrogram. Additionally, audio data can be represented according to an acoustic model that models the auditory response of a biological ear, in particular, a cochlea. A cochlear model can be used to generate an auditory image representation of audio data as a function of time, frequency, and autocorrelation delay. For example, generating an audio correlogram or a stabilized auditory image can include applying a cochlear model to audio data.

Users may wish to identify audio files having particular audio content. For example, a user can seek examples of particular sounds for inclusion in a project or a home movie. The user can describe the desired sounds with textual labels, for example, a name of a sound or description of that sound (e.g., "car sounds" or "roaring tiger"). However, conventional information retrieval of audio content using textual queries (e.g., performing a search for audio content on the Internet) is difficult and often provides inaccurate results.

SUMMARY

This specification describes technologies relating to using audio features to classify and index sounds, and to retrieve sounds from text queries. In general, one aspect of the subject matter described in this specification can be embodied in methods that include the actions of generating a collection of auditory images, each auditory image being generated from respective audio files according to an auditory model; extracting sparse features from each auditory image in the collection to generate a sparse feature vector representing the corresponding audio file; and ranking the audio files in response to a query including one or more words using the sparse feature vectors and a matching function relating sparse feature vectors to words in the query. Other embodiments of this aspect include corresponding systems, apparatus, and computer program products.

These and other embodiments can optionally include one or more of the following features. Extracting sparse features from each auditory image includes dividing an auditory image into multiple sub-images; applying a feature extractor to each sub-image to generate corresponding local sparse codes; and combining the sparse codes from each sub-image to form a sparse vector for the auditory image. The matching function is generated using a training collection of annotated audio files, and where generating the matching function includes receiving the collection of annotated audio files, each annotated audio file having an auditory image and one or more keywords associated with the content of the audio file; generating a sparse feature vector for each audio file in the collection; and training the matching function using the sparse feature vectors and the one or more keywords for the collection of annotated audio files to determine a matrix of weights matching sparse features and keywords. The method further includes training the matching function using a passive-aggressive model using extracted audio features. The training learns a matrix W representing a mapping between spars features and keywords such that $F_W(q_k, a_k^+) > F_W(q_k, a_k^-)$ for all k. Ranking the audio files further includes scoring each query word relative to each sparse feature vector and combining the scores across words to rank audio files relative to the query. Scoring each query word includes calculating a dot product between a set of weights for that word and a representation of the audio file with a particular sparse feature vector. The auditory model is a cochlear model that mimics the behavior of a cochlea. The auditory image is a stabilized auditory image. The auditory image is an auditory correlogram.

In general, another aspect of the subject matter described in this specification can be embodied in methods that include the actions of receiving a text query, the query including one or more query terms; retrieving a matching function that relates keywords and sparse feature vectors, each sparse feature vector being derived from a particular audio file; identifying one or more keywords from the query terms; identifying one or more audio files responsive to the query using the matching function; and presenting search results identifying the one or more audio files. Other embodiments of this aspect include corresponding systems, apparatus, and computer program products.

Particular embodiments of the subject matter described in this specification can be implemented so as to realize one or more of the following advantages. Sparse features are extracted that are representative of particular sounds. Audio data can then be classified using these audio features and a learned relationship to word features that identify what the audio data "sounds like". A system can then quickly and relatively accurately retrieve and rank audio content in response to textual search queries.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
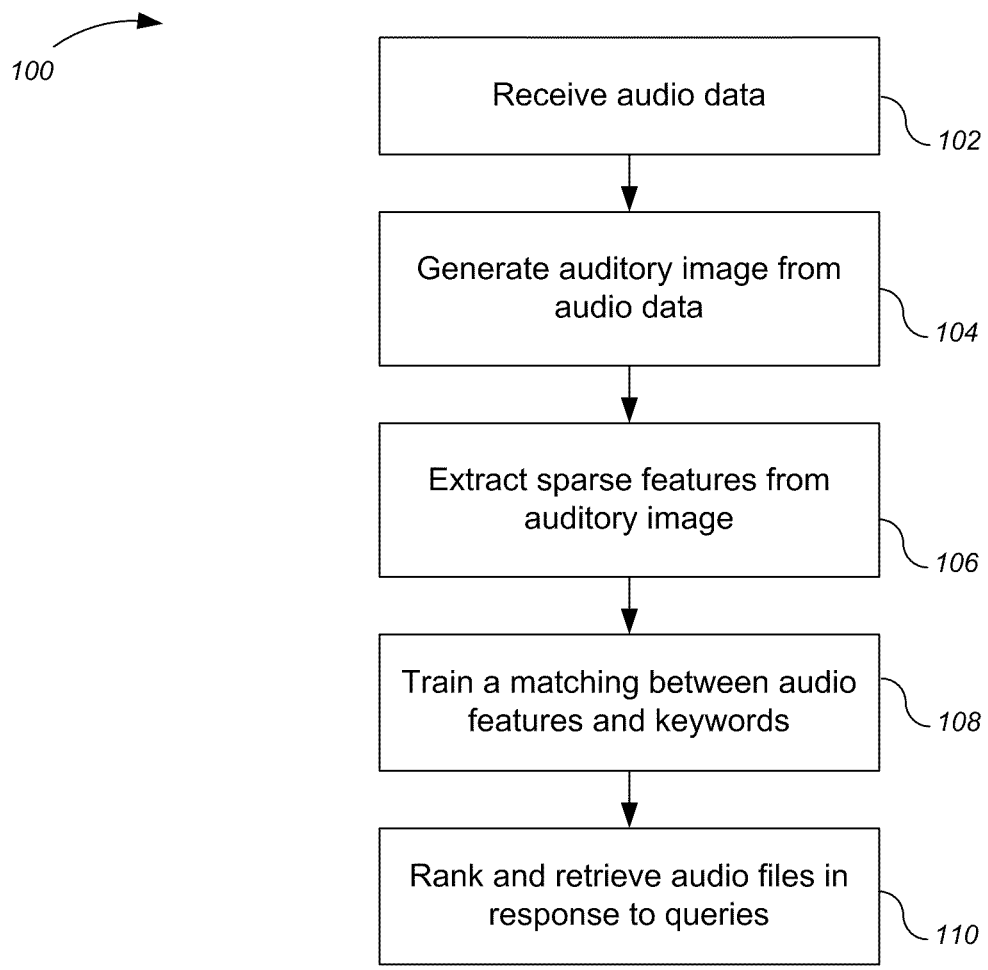
FIG. 1 is flowchart showing an example method for using sparse audio features to retrieve sounds in response to text queries.

FIG. 1 is flowchart showing an example method 100 for using sparse audio features to retrieve sounds in response to text queries. For convenience, the method 100 will be described with respect to a system that performs the method 100.

The system receives 102 audio data. For example, the audio data can be an audio file from a collection of audio files. Each audio file can include audio data and non-audio data. For example, an audio file can include music, speech, or other audio content but can also represent an audio portion of a file that also include non-audio data (e.g., a video file that includes a video track and an audio track that have been mixed to a single file). In such cases, the audio data is extracted or isolated in order to perform operations on the audio data (e.g., extracting the audio track from a file including multiple content types).

The system generates 104 an auditory image from the received audio data. The auditory image is generated according to a particular auditory model, e.g., a cochlear model. The auditory image can be, for example, an audio correlogram or a stabilized auditory image. In some implementations, an auditory front end of the system receives as input an audio waveform corresponding to the received audio data. The auditory front end applies the cochlear model to the audio waveform to generate the auditory image.

A cochlear model mimics the behavior of a cochlea, e.g., in a human inner ear. The cochlea is filled with a fluid that moves in response to the vibrations coming from the middle ear, generated by incoming sounds. As the fluid moves, hair cells in the cochlea move, converting the mechanical energy of the fluid vibrations to a pattern of nerve firings. The frequency response to the vibrations changes as a function of location as some hair cells are more sensitive to the vibrations of some frequencies than others. The result of this hair-cell arrangement is that the cochlea acts as a series of frequency filters whose pass band is a function of the position along the cochlea.

Generating auditory images including a correlogram or stabilized auditory image involves generating a cochleagram from input audio data (e.g., an input audio waveform) based on a cochlear model and then generating the auditory image from the cochleagram. The cochleagram is a spectral-temporal representation of the audio data.

Generating a cochleagram (e.g., at an auditory front end of the system) includes using a group of cochlear filters to split the input audio data into a number of frequency bands (e.g., using a cascade of low-pass filters or a parallel bank of band-pass filters). The group of filters represents the filtering resulting from the varied response of cochlea hair cells as a function of frequency or location. The output from each filter in the group of filters is a channel representing a particular frequency band. The energy in each channel is detected and used to adjust the gain for the audio data in the band, for implementing a simple model of auditory sensitivity adaptation, or for automatic gain control (AGC). In some implementations, a half-wave rectifier (HWR) is applied to the output frequency bands to provide a waveform for audio data in each channel that represents the neural firing rate at each position along a model cochlea. In particular, the half-wave rectifier models the hair cells in the cochlea that respond to movement in one direction. The resulting cochleagram provides a representation of the audio data as a function of frequency and time based on the cochlear model.

The auditory image adds an additional dimension to the cochlear representation, by calculating the auto-correlation of each frequency channel, for a set of given points in time. At each such given point in time, the one-dimensional representation, which is the output of the series of filters, is transformed into a two-dimensional representation, replacing the scalar output of every filter with an autocorrelation vector. When these images are taken across time, the resulting auditory images provide a three-dimensional function of frequency, time, and autocorrelation delay for the audio data.

Figure 2:
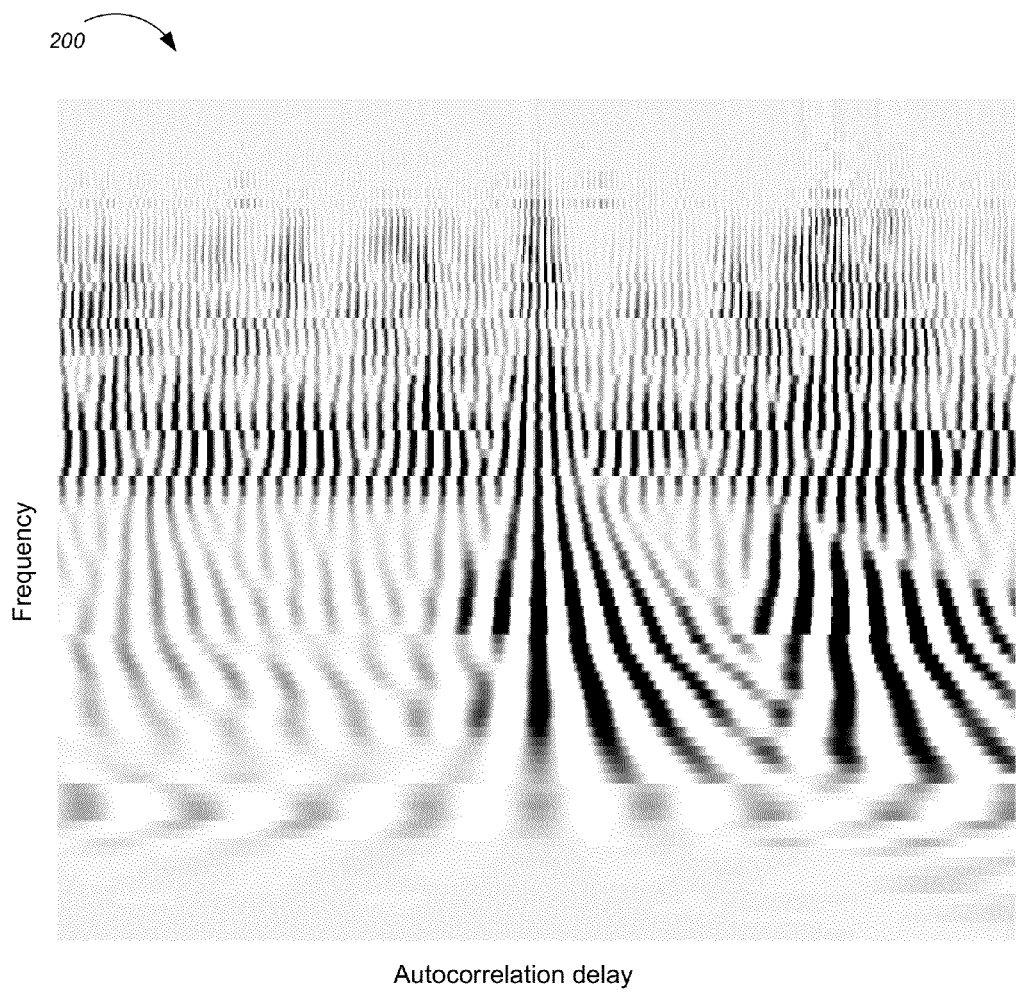
FIG. 2 is a diagram illustrating an example audio image.

FIG. 2 is a diagram illustrating an example audio image 200. In particular, audio image 200 is a stabilized auditory image generated from an input audio waveform. The audio image 200 represents audio data as a function of frequency, time, and autocorrelation delay. In particular, as shown in FIG. 2, the x-axis represents autocorrelation delay while the y-axis repress frequency, and the image changes at each time step. The image is "stabilized" in the sense that the pattern is steady for a steady sound such as a sustained speech sound, a steady musical note, or a steady noise. The nature of the sound affects the image, and what the image "looks like" represents what the sound "sounds like".

As shown in FIG. 1, the system extracts 106 sparse audio features from the auditory image. Audio features can represent various things that can be used to classify audio data. For example, a number of different features can be associated with audio data including time-domain and frequency-domain features (e.g., energy envelope and distribution, frequency content, harmonicity, and pitch). Other audio features common to speech and music classification include mel-frequency cepstral coefficients representing a short-term power spectrum of a sound.

Other audio features are sparse audio features. Sparse, as used in the present specification, means that most of the feature values for each given sound are zero, and the set of all features can be efficiently encoded by just listing the nonzero features. In particular, sparse audio features represent abstract local structural properties of the auditory image. An individual feature may have little useful interpretation, but a large set of them collectively can provide information about the nature of the sound. Extraction of the sparse features from an auditory image is described in greater detail below with respect to FIG. 3.

In some implementations, a set of sparse features is computed on each time frame of the auditory image and aggregated, or collected, to indicate how many times each feature occurs throughout an entire sound, e.g., over an entire movie soundtrack. The result is referred to as a "bag of features" representation of the sound. The "bag of features" concept has also been used for representing images and other media types, and is analogous to the "bag of words" representation of text documents—a bag of words is a representation of how many times each word occurs in a document, irrespective of word order, and has been found to be a useful representation of text documents for indexing and retrieval.

The system trains 108 a matching function that relates the audio sparse features to words in a query vocabulary. In particular, the system uses training data to train a function that scores the quality of a matching between two pairs of sparse vectors: one vector that represents sound data and another vector that represents a set of keywords (text query). The keywords with high scores for a sound are representative of what the audio data "sound like". The set of features of one frame, or a "bag of features" representing a longer segment or a whole sound, can be converted by the trained matching to what can be used as a "bag of words" representation of the sound, even though this bag of words does not come from words but from the sound, and may include numbers, e.g., positive and negative real numbers, rather than just integer word counts. Training to generate the matching associating combinations of sparse features with keywords, that is, for conversion of bag of features to bag of words, is described in greater detail below with respect to FIG. 5.

Thus, a given combination of extracted sparse features can be matched to one or more keywords associated with that combination of sparse features. For example, if the content of the audio data includes a lion roar sound, some of the extracted sparse features will contribute to the matching to keywords associated with a lion roar (e.g., "lion" and "roar").

The system scores 110 the audio data according to the sparse features, in relation to a given query of one or more words, or terms. The process can be repeated for the audio data for each of a collection of audio files such that for a given query each audio file can be given a score associated with the query. The system sorts, or ranks, the audio files according to those scores. The system can store the features for all the sounds, and a representation of the matching function, locally or distributed across a number of different storage media. The system can then access the features and matching representation during information retrieval, for example, in response to a search query as described below with respect to FIG. 6, and can return a number of top-ranked sound files.

Figure 3:
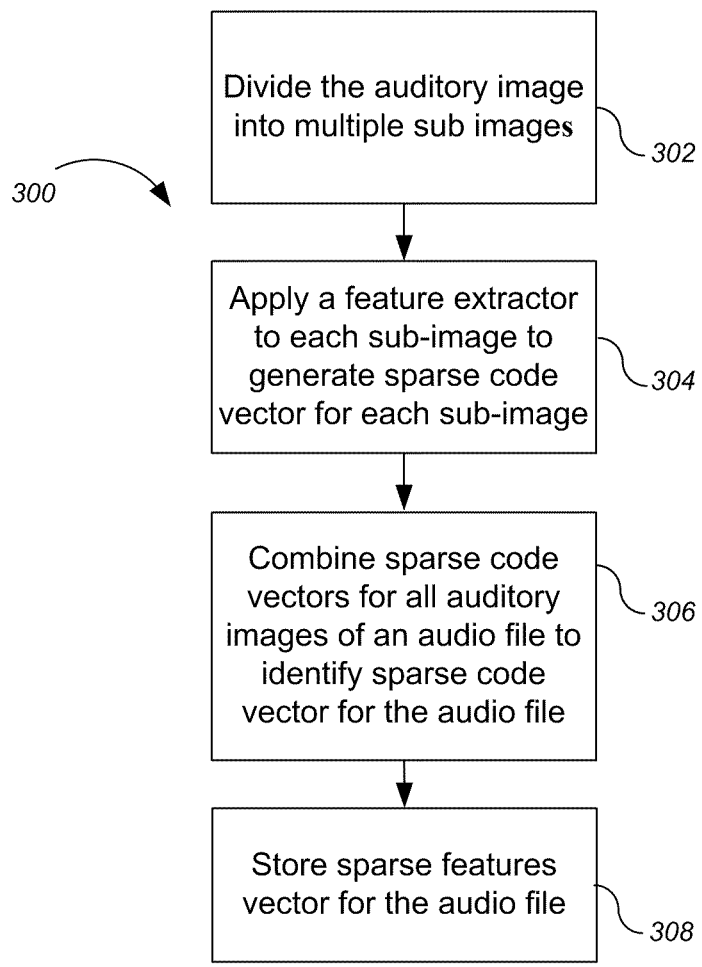
FIG. 3 is a flowchart of an example method for sparse feature extraction.

FIG. 3 is a flowchart of an example method 300 for sparse feature extraction. For convenience, the method 300 will be described with respect to a system that performs the method 300. The system uses a collection of feature extractors (e.g., vector quantizers). Each feature extractor converts a sub-image of the auditory image to a one-of-N sparse code. For N equal to 250, and 100 sub-images used, this results in a net sparse code with substantially 100 nonzero elements in a 25,000-dimensional sparse feature The system divides 302 the auditory image into multiple sub-images according to a predetermined pattern. This process is referred to as box cutting. In some implementations, the box cutting divides the auditory image into overlapping rectangles, as shown in FIG. 4.

Figure 4:
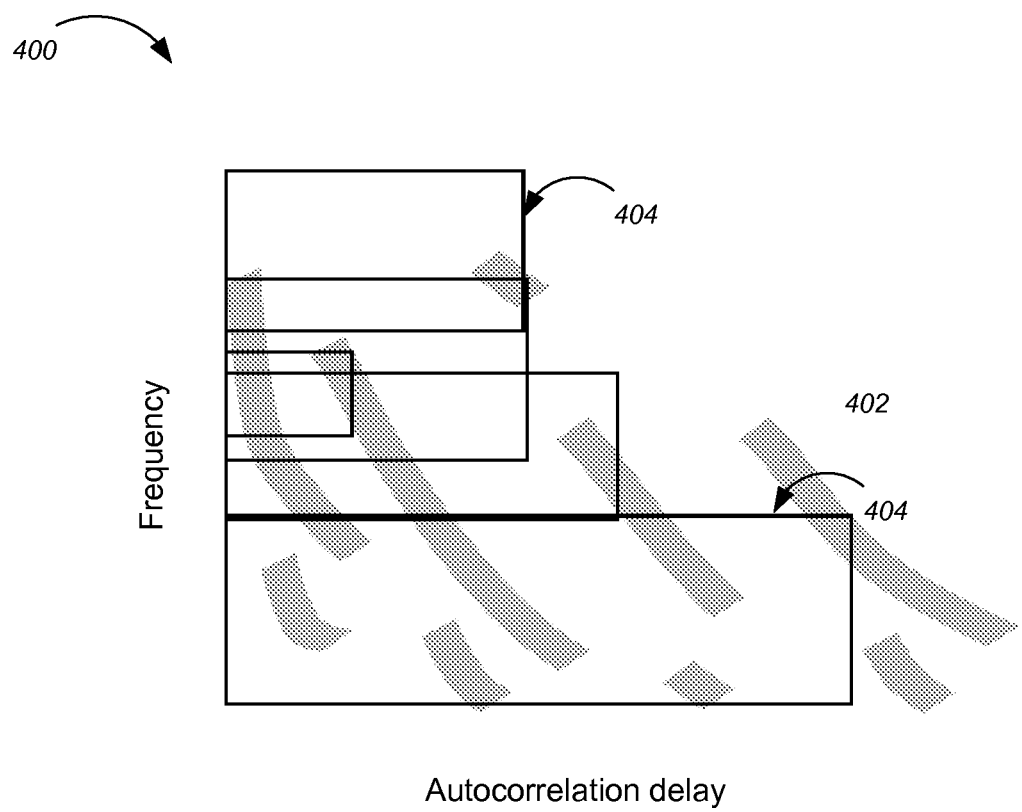
FIG. 4 is a diagram illustrating an example of applying box cutting to an audio image.

FIG. 4 is a diagram 400 illustrating an example of box cutting an audio image 402. The image is divided into a number of sub-images 404. The feature extractors are then applied to the content of each sub-image to extract sparse features.

The rectangles have different sizes, in order to capture information at multiple scales in the auditory image. The system independently varies horizontal and vertical sizes. Additionally, the system varies the vertical position of the rectangles. The system rescales these rectangles into a fixed size, the same for all rectangles, regardless of their original sizes. Typically this results in a smaller size. For each re-sized rectangle, the system optionally calculates horizontal and vertical marginals. The marginals are the average values for each column and row in the particular rectangle. The horizontal and vertical marginal for each individual rectangle are concatenated into a single real-valued vector. Alternatively, the system maintains each rectangle contents as a single vector, without reducing to its marginals.

The system applies 304 a feature extractor to each sub-image to generate a local sparse code for that sub-image. The system approximates each of the vectors that represent the rectangular areas in the auditory image with sparse codes. The system can use either vector quantization or matching pursuit to approximate the vectors.

Vector quantization approximates a vector using a best matching vector from a codebook (the closest in the Euclidean sense). Once the best match has been selected, the representation can be encoded as a sparse code vector, with a length equal to the size of the codebook, and that includes all zeros, except for a single "one" at the index position of the chosen code word.

Matching pursuit projects a vector (representing a rectangle) onto the codebook vectors, finds the largest projection, adds the signed scalar value of that projection to the sparse vector representation (in the appropriate index position), and subtracts the vector valued projection from the original vector, producing a residual vector. The process is then repeated until the magnitude of the largest projection becomes smaller than a given threshold.

For both matching pursuit and vector quantization the system learns individual codebooks tailored to represent the rectangles at each specific position in the auditory image. The system learns the codebook from data using e.g. a k-means algorithm.

The system collects the sparse codes from all the sub-images to make a large sparse code vector for the entire frame. In particular, once each rectangle has been converted into a sparse code they are concatenated into one high-dimensional sparse vector, representing the entire auditory image.

To represent an entire audio file, the system combines 306 the sparse vectors representing individual frames into a sparse vector representing the audio data of the audio file, e.g., by simply summing them up. The resulting vector is often less sparse than the vectors for individual frames, but is usually still sparse.

The system can store 308 the spare code vectors of the audio file as well as for other audio files. These vectors can then used, for example, to represent the audio data in a training system or to identify audio files matching a given query.

Figure 5:
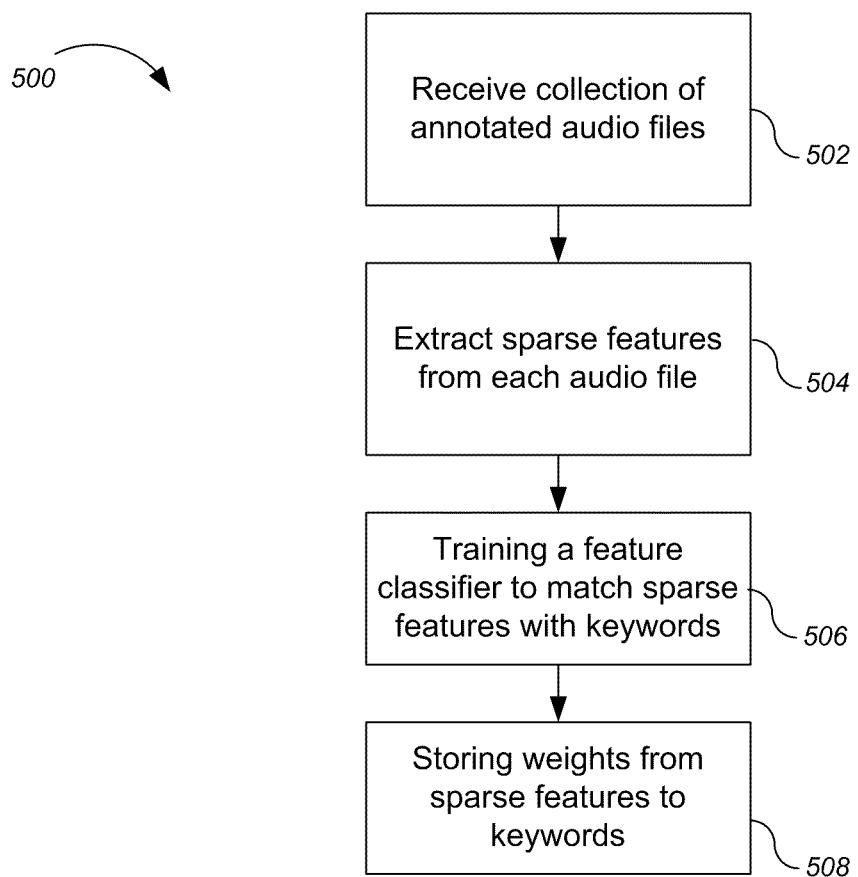
FIG. 5 is a flowchart of an example method for training a system to match keywords and sparse features.

FIG. 5 is a flowchart of an example method 500 for training a system to map sparse features to keywords. For convenience, the method 500 will be described with respect to a system that performs the method 500.

The system receives 502 a collection of annotated audio. The collection of annotated audio files can include files that only include audio data and files that include audio data in addition to other content types (e.g., audio and video content). For example, the collection of annotated audio files can include audio files received from a repository that includes one or more keyword tags for each audio file identifying the corresponding content of the audio files.

In some implementations, the system selects audio files for inclusion in the collection of annotated audio files to be used in training from a repository of sound effects. The repository of sound effects can include clean audio data having only one audio object (e.g., a lion roar without other sounds). For example, the system can use a repository of commercially or freely available sound effect to select audio files for inclusion in the collection of audio files. In some implementations, the selected audio files do not have labels identifying the content of the audio data. In such cases, the audio files can be manually labeled, for example, by having human listeners review each audio file and assign one or more labels for each audio file.

In some implementations, the audio files are assigned hierarchical labels. For example, if an audio file is labeled with the keyword "cat", additional keywords "feline," "mammal," and "animal" can be added. In some scenarios, the labels are limited to a predefined keyword vocabulary to provide labeling consistency.

In some implementations, the system selects audio files for inclusion in the collection of annotated audio files to be used in training from a repository of user uploaded audio files. For example, the Freesound project (http://freesound.org) provides an online repository of publicly available labeled audio files. Individual users can upload audio files along with one or more labels identifying the content of each uploaded audio file. In contrast to the special effects audio files, these audio files can each include more than one audio object combined into a complex audio scene (i.e., not just a single specific sound).

The labels from the selected audio files can be processed to generate keywords associated with each audio file of the collection. For example, tags can be filtered to remove tags containing numbers and stopwords. The tags can also be stemmed to remove format suffixes (e.g., mp3, way, afi), the tags can also spell checked to corrects spelling errors and all words can be stemmed (e.g., to remove plurals or other modifiers including, for example, "-s" and "-ing" suffixes from the tags). A vocabulary can be defined based on the unique keywords generated from the audio file labels. In some implementations the labels of some audio files may be noisy. For example, in some cases some of the labels do not describe correctly the content of the audio file. For example, an audio file that contains a lion roar may be labeled as containing human singing.

The system extracts 504 sparse features from each audio file. The sparse features can be extracted, for example, as described with respect to FIG. 3. Thus, for each audio file there are extracted sparse features and one or more keywords.

The system trains 506 a matching function, such as a linear matrix mapping, to match sparse features with keywords. Given any sparse feature vector and any set of labels, the matching function computes a score that measures the quality of the association between the two. As a consequence of the training, the content of an audio file having a particular combination of sparse features generates a bag of words containing one or more keywords in the vocabulary, in which the words represent what the sound sounds like.

Different training techniques can be used to train a matching function. For example, the matching function can be trained as a ranker using a classifier, as is well known in machine learning. Training techniques including "Passive-aggressive model for image retrieval" (PAMIR), Gaussian mixture models (GMMs), and Boosting or support vector machines (SVMs). GMMs are used to calculate a probability density function of audio documents. Training GMM models can use a maximum a posteriori (MAP) approach. SVMs and Boosting seek a discriminant function that maximizes a margin between positive and negative examples while minimizing a number of misclassifications in training.

PAMIR is a technique originally applied to content-based image retrieval from text queries. PAMIR is trained specifically to produce a good ranking of media documents (images or sounds) in response to queries, rather than for classification. PAMIR can be adapted for training content-based audio retrieval simply by using audio feature instead of image features; it works as follows:

A query q can be represented by a vector of normalized inverse document frequency (tf-idf) weights for each keyword in a vocabulary T (e.g., in the vocabulary of keywords derived from labeled training data), where $q \in \Re^{|T|}$.

A document (e.g., an audio file) can be represented by a sparse feature vector $a \in \Re^{d_a}$ of dimension d, where $d_a$ represents the potential number of sparse audio features. For a matrix W of dimensions ($|T| \times d_a$), a query level score $F_W(q, a)$ can be defined as:

$$F_W(q,a) = q^{transp} Wa,$$

which measures how well a document a matches a query q. Additionally, W can be viewed as a transformation from an acoustic representation to a textual one, $W: \Re^{d_a} \to \Re^{|T|}$. Thus, the score becomes a dot product between vector representations of a text query q and a "bag of words" or "text document" Wa, with each component, for word t, computed as the score for a single-word query:

$$\text{score}_{PAMIR}(a,t) = W_t a,$$

where $W_t$ is the t-th row of W. W is therefore the matrix to be learned, representing the linear mapping from audio "bag of features" to "bag of words".

For a training set of text queries and audio documents, a finite training set $D_{train}$ (e.g., the collection of audio files in the training set) can be represented as a set of triplets $D_{train} = \{(q_1, a_1^+, a_1^-), \ldots, (q_n, a_n^+, a_n^-)\}$, where for the $k^{th}$ triplet $(q_k, a_k^+, a_k^-)$, $q_k$ is a text query, $a_k^+ \in REL(q_k, A_{train})$ is an audio document relevant to $q_k$ and $a_k^- \notin REL(q_k, A_{train})$ is an audio document non-relevant to $q_k$. The PAMIR approach identifies parameters W such that for every k, $F_W(q_k, a_k^+) - F_W(q_k, a_k^-) \geq \epsilon$, $\epsilon > 0$. This can be rewritten as a loss function $l_W((q_k, a_k^+, a_k^-)) = 0$, $\forall k$ where $l_W((q_k, a_k^+, a_k^-)) = \max\{0, \epsilon - F_W(q_k, a_k^+) + F_W(q_k, a_k^-)\}$. Thus, the PAMIR approach aims to identify W such that for all k, the score $F_W(q_k, a_k^+)$ should be greater than the score $F_W(q_k, a_k^-)$ by at least a margin of epsilon. Thus, for as many combinations of documents and queries in the training set as possible, the scores for documents relevant to a given query should be higher than scores for documents not relevant to the query.

Training the model on the training set using PAMIR includes using a passive-aggressive (PA) family of techniques developed for classification and regression problems to iteratively minimize:

$$L(D_{train}; W) = \sum_{k=1}^{n} l_W((q_k, a_k^+, a_k^-)).$$

At each training iteration i, PAMIR solves the following convex problem:

$$W^i = \underset{W}{\arg\min} \frac{1}{2} \|W - W^{i-1}\|^2 + C l_W((q_k, a_k^+, a_k^-)).$$

where $\|W - W^{i-1}\|$ is the point-wise $L_2$ norm. Therefore, at each iteration, $W^i$ is selected as a trade-off between remaining close to the previous parameters $W^{i-1}$ and minimizing the loss on the current example $l_W(q_k, a_k^+, a_k^-)$. An aggressiveness parameter C controls this trade-off. The solution of this convex optimization problem is:

$$W^i = W^{i-1} + \tau_i V^i,$$

$$\text{where } \tau_i = \min\left\{C, \frac{l_{W^{i-1}}(q_k, a_k^+, a_k^-)}{\|V^i\|^2}\right\}$$

$$\text{and } V^i = -[(q_i^1(a_k^+ - a_k^-), \ldots, q_i^{|T|}(a_k^+ - a_k^-)]$$

where $q_i^j$ is the j-th value of vector $q_i$ and $V_i$ is the gradient of the loss with respect to W.

During the training process, the vocabulary of queries corresponds to the keywords identified to represent the audio files in the training data. The solution to the convex minimization problem uses training data of known associations to learn general associations between particular keywords and particular audio content according to an iterative process that leads to higher scores for the more likely matches between keywords and audio content, as represented by sparse features extracted from each audio file. This training process is used to generate a matching between sparse features and keywords.

The system stores 508 the matching function between sparse features and keywords, in the form of the matrix W. This matching can then be used to identify keywords for un-annotated audio data as described above with respect to FIG. 1.

Figure 6:
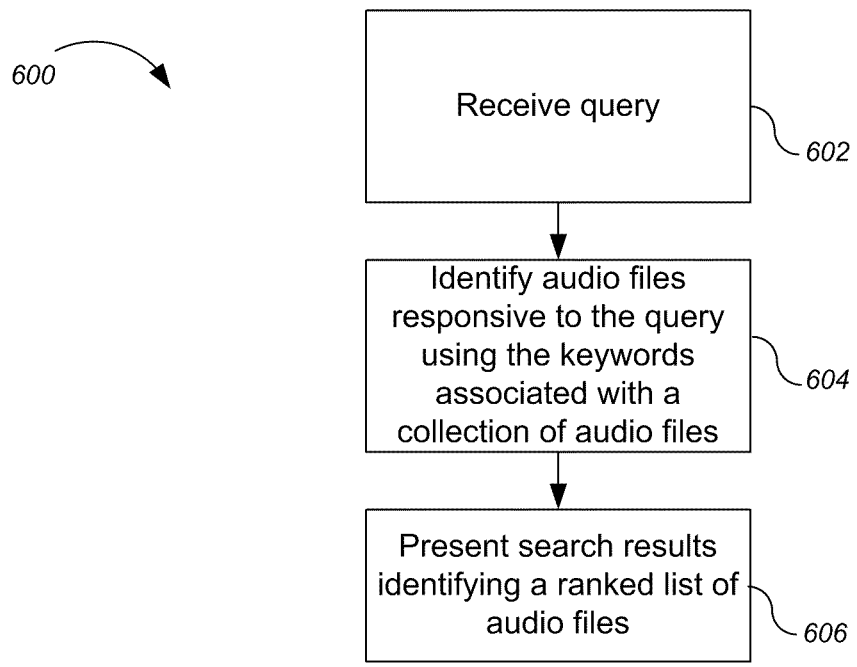
FIG. 6 is a flowchart of an example method for searching for audio content.

FIG. 6 is a flowchart of an example method 600 for searching for audio content. For convenience, the method 600 will be described with respect to a system that performs the method 600. The system receives 602 a query for audio content. The received query includes one or more query terms, for example "recording of lion roar".

The system identifies 604 audio files responsive to the query using the keywords associated with a collection of audio files. In particular the query is matched to one or more keywords in the vocabulary. This can include removing query terms that do not have corresponding vocabulary entries. For example, the query "recording of lion roar" can be reduced to "lion roar". The matching keywords are used to form a query vector q, representing the query. The query vector q is sparse (most components have value zero) since only a few keywords of all possible keywords are present in any query. A score calculated with respect to the query vector and the sparse features of each audio file includes calculating a dot product between the query vector and the "bag of words" features Wa.

Thus, the score is a dot product between vector representations of a text query q and a "text document" or "bag of words" representing the audio file, with feature vector Wa, $F_W(q, a) = q^{transp} Wa$. The score indicates how closely a particular audio file matches the search query. The higher the score, the more likely the audio file is to be a good response to the search query. Thus, a ranked list of audio files can be identified in response to the query according to the scoring. The system can specify a top-k limit for search results based on rank for presentation.

The system optionally uses a pre-computed index, indexed by query terms, to identify audio files that have a potential to be ranked high with respect to a query, by virtue of having a significant positive keyword score for at least one query term. In particular, The indexing identifies potentially acceptable query matches to be ranked, so that the system does not compute the ranking function for all audio files for a received query. For example, for the query "lion roar", an index could identify 1000 audio files that have a bit of "lion" in them, and identify a few thousand audio files that have some "roar" in them. The system can then use the ranking function to combine just those audio files to identify a ranked list instead of scoring all audio files. Alternatively, other fast methods of computing the dot product with the sparse query vector for all audio files can be used, including locality sensitive hashing or neighborhood trees The system presents 606 search results identifying a ranked list of audio files. In particular, the search results can be presented as a set of links to resources corresponding to the audio files having content responsive to the query. The search results can be presented as a list, as icons, or as thumbnail auditory images.

Figure 7:
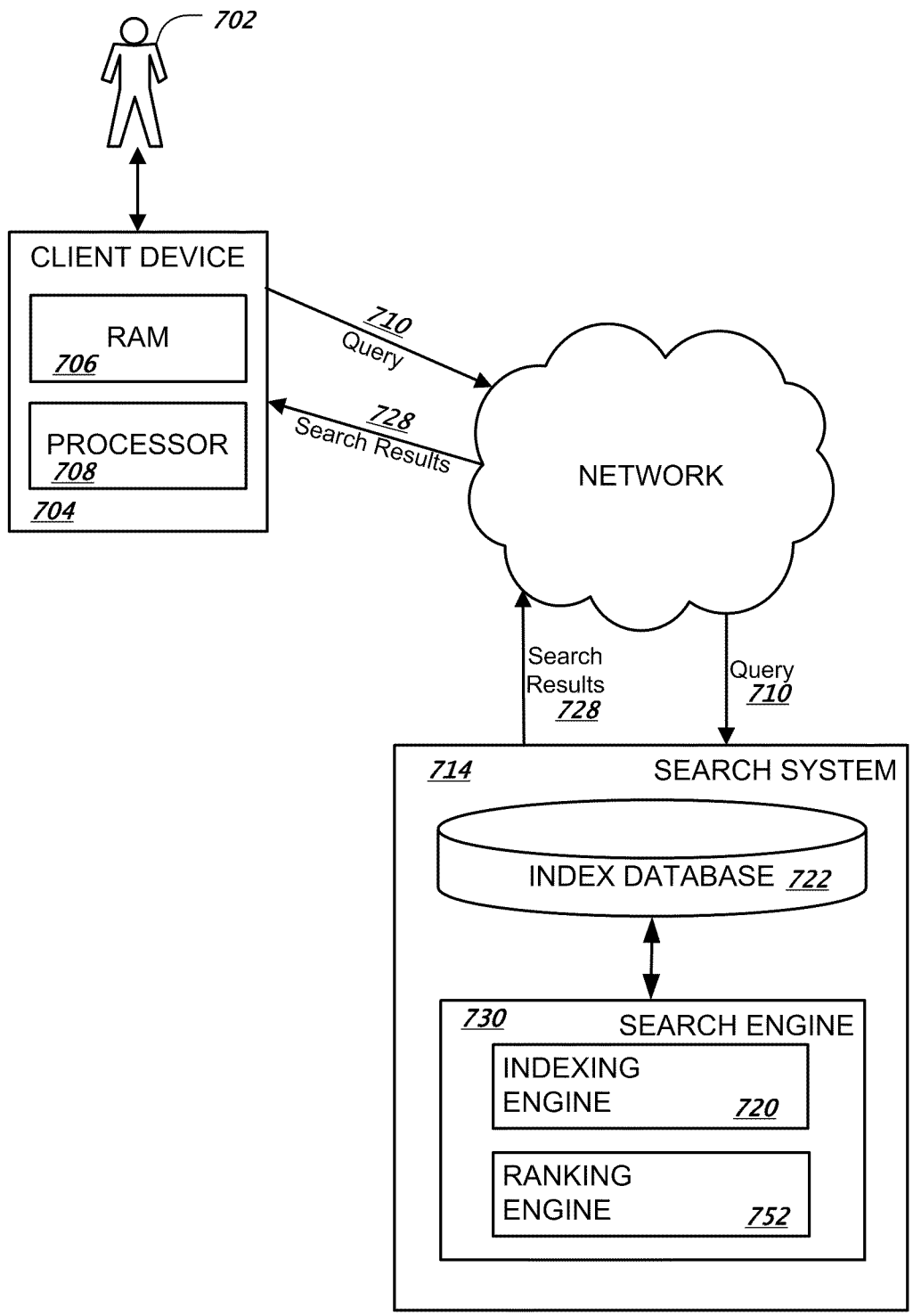
FIG. 7 illustrates an example search system.

FIG. 7 illustrates an example search system 714 for providing search results relevant to submitted queries as can be implemented in an internet, an intranet, or another client and server environment. The search system 714 is an example of an information retrieval system in which the systems, components, and techniques described below can be implemented.

A user 702 can interact with the search system 714 through a client device 704. For example, the client 704 can be a computer coupled to the search system 714 through a local area network (LAN) or wide area network (WAN), e.g., the Internet. In some implementations, the search system 714 and the client device 704 can be one machine. For example, a user can install a desktop search application on the client device 704. The client device 704 will generally include a random access memory (RAM) 706 and a processor 708.

A user 702 can submit a query 710 (e.g., a query for audio content) to a search engine 730 within a search system 714. When the user 702 submits a query 710, the query 710 is transmitted through a network to the search system 714. The search system 714 can be implemented as, for example, computer programs running on one or more computers in one or more locations that are coupled to each other through a network. The search system 714 includes an index database 722 and a search engine 730. The search system 714 responds to the query 710 by generating search results 728, which are transmitted through the network to the client device 704 in a form that can be presented to the user 702 (e.g., a search results web page to be displayed in a web browser running on the client device 704 that lists identifiers for audio resources responsive to the audio query).

When the query 710 is received by the search engine 730, the search engine 730 identifies resources that match the query 710. The search engine 730 will generally include an indexing engine 720 that indexes resources (e.g., audio data, web pages, images, or news articles on the Internet) found in a corpus (e.g., a collection or repository of content), an index database 722 that stores the index information, and a ranking engine 752 (or other software) to rank the resources that match the query 710. The indexing and ranking of the resources can be performed using conventional techniques in combination with the ranking techniques described above. The search engine 730 can transmit the search results 728 through the network to the client device 704, for example, for presentation to the user 702.

The search system 714 may also maintain one or more user search histories based on the queries it receives from a user. Generally speaking, a user search history stores a sequence of queries received from a user. User search histories may also include additional information such as which results were selected after a search was performed and how long each selected result was viewed.

In particular, when a query 710 is a request for audio content, the search engine 730 can search for resources that match the query 710 using a vocabulary of keywords and an index of identifying potential matches as described above (e.g., as stored in an index database 722) or by accessing stored features for all the sounds or a representation of the matching function stored in the search system as described with respect to FIG. 1. The ranking engine 752 can rank audio data responsive to the query 710 based on the scores calculated when determining the audio data that match the query 710.

Figure 8:
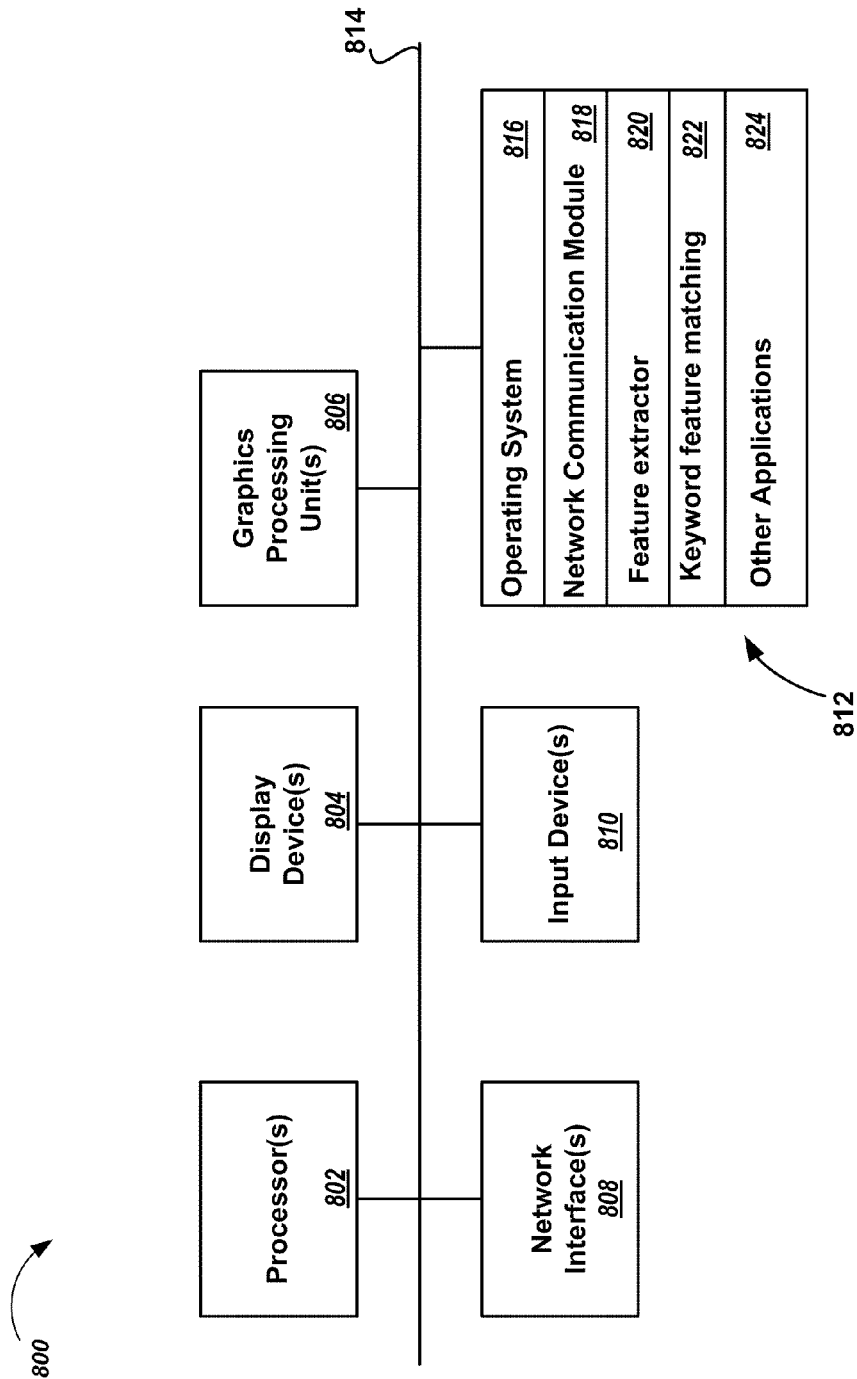
FIG. 8 illustrates an example architecture of a system.

FIG. 8 illustrates an example architecture of a system architecture 800. The architecture 800 includes one or more processors 802 (e.g., IBM PowerPC, Intel Pentium 4, etc.), one or more display devices 804 (e.g., CRT, LCD), graphics processing units 806 (e.g., NVIDIA GeForce, etc.), a network interface 808 (e.g., Ethernet, FireWire, USB, etc.), input devices 810 (e.g., keyboard, mouse, etc.), and one or more computer-readable mediums 812. These components exchange communications and data using one or more buses 814 (e.g., EISA, PCI, PCI Express, etc.).

The term "computer-readable medium" refers to any medium that participates in providing instructions to a processor 802 for execution. The computer-readable medium 812 further includes an operating system 816 (e.g., Mac OS®, Windows®, Linux, etc.), a network communication module 818, a feature extractor 820, a keyword feature matching 822, and other applications 824.

The operating system 816 can be multi-user, multiprocessing, multitasking, multithreading, real-time and the like. The operating system 816 performs basic tasks, including but not limited to: recognizing input from input devices 810; sending output to display devices 804; keeping track of files and directories on computer-readable mediums 812 (e.g., memory or a storage device); controlling peripheral devices (e.g., disk drives, printers, etc.); and managing traffic on the one or more buses 814. The network communications module 818 includes various components for establishing and maintaining network connections (e.g., software for implementing communication protocols, such as TCP/IP, HTTP, Ethernet, etc.).

The feature extractor 820 provides various software components for performing the various functions for extracting sparse features from audio data as described with respect to FIGS. 3-4. The keyword feature matching 822 provides various software components for performing the various functions for training a model to associate sparse features with keywords and applying the model to received sparse features in order to identify matching keywords, as described with respect to FIGS. 1-5. The other application 824 can include an auditory image generator for generating auditory images from input audio files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage media for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be, or be included in, a computer-readable storage device, a computer-readable storage substrate, a random or serial access memory array or device, or a combination of one or more of them.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or combinations of them. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, e.g., a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    generating a collection of auditory images including a plurality of audio images from each of a plurality of audio files, each auditory image being generated from respective audio files according to an auditory model;
    for each audio file, extracting sparse features from each auditory image generated for the audio file to generate a sparse feature vector representing the audio file, wherein extracting sparse features from each auditory image comprises:
        dividing the auditory image into multiple sub-images,
        applying a feature extractor to each sub-image to generate corresponding local sparse codes, and
        combining the sparse codes from each sub-image to form a sparse vector for the auditory image; and
    ranking the audio files in response to a query including one or more words using the sparse feature vectors and a matching function relating sparse feature vectors to words in the query.

2. The method of claim 1, where the matching function is generated using a training collection of annotated audio files, and where generating the matching function includes:
    receiving the collection of annotated audio files, each annotated audio file having an auditory image and one or more keywords associated with the content of the audio file;
    generating a sparse feature vector for each audio file in the collection; and
    training the matching function using the sparse feature vectors and the one or more keywords for the collection of annotated audio files to determine a matrix of weights matching sparse features and keywords.

3. The method of claim 1, further comprising:
    training the matching function using a passive-aggressive model using extracted audio features.

4. The method of claim 3, where the training learns a matrix W representing a mapping between spars features and keywords such that $F_W(q_k, a_k^+) > F_W(q_k, a_k^-)$ for all k.

5. The method of claim 1, where ranking the audio files further comprises:
    scoring each query word relative to each sparse feature vector and combining the scores across words to rank audio files relative to the query.

6. The method of claim 5, where scoring each query word includes calculating a dot product between a set of weights for that word and a representation of the audio file with a particular sparse feature vector.

7. The method of claim 1, where the auditory model is a cochlear model that mimics the behavior of a cochlea.

8. The method of claim 1, where the auditory image is a stabilized auditory image.

9. The method of claim 1, where the auditory image is an auditory correlogram.

10. A computer-implemented method comprising:
receiving a text query, the query including one or more query terms;
retrieving a matching function that relates keywords and sparse feature vectors, each sparse feature vector being derived from a particular audio file, wherein each sparse feature vector is generated using sparse features extracted from a plurality of audio images, and wherein the sparse features represent abstract local structural properties of the auditory image;
identifying one or more keywords from the query terms;
identifying one or more audio files responsive to the query using the matching function; and
presenting search results identifying the one or more audio files.

11. A non-transitory computer storage medium encoded with a computer program, the program comprising instructions that when executed by data processing apparatus cause the data processing apparatus to perform operations comprising:
generating a collection of auditory images including a plurality of audio images from each of a plurality of audio files, each auditory image being generated from respective audio files according to an auditory model;
for each audio file, extracting sparse features from each auditory image generated for the audio file to generate a sparse feature vector representing the audio file, wherein extracting sparse features from each auditory image comprises:
dividing the auditory image into multiple sub-images,
applying a feature extractor to each sub-image to generate corresponding local sparse codes, and
combining the sparse codes from each sub-image to form a sparse vector for the auditory image; and
ranking the audio files in response to a query including one or more words using the sparse feature vectors and a matching function relating sparse feature vectors to words in the query.

12. The computer storage medium of claim 11, where the matching function is generated using a training collection of annotated audio files, and where generating the matching function includes:
receiving the collection of annotated audio files, each annotated audio file having an auditory image and one or more keywords associated with the content of the audio file;
generating a sparse feature vector for each audio file in the collection; and
training the matching function using the sparse feature vectors and the one or more keywords for the collection of annotated audio files to determine a matrix of weights matching sparse features and keywords.

13. The computer storage medium of claim 11, further comprising instructions that when executed by data processing apparatus cause the data processing apparatus to perform operations including:
training the matching function using a passive-aggressive model using extracted audio features.

14. The computer storage medium of claim 13, where the training learns a matrix W representing a mapping between spars features and keywords such that $F_W(q_k, a_k^+) > F_W(q_k, a_k^-)$ for all k.

15. The computer storage medium of claim 11, where ranking the audio files further comprises:
scoring each query word relative to each sparse feature vector and combining the scores across words to rank audio files relative to the query.

16. The computer storage medium of claim 15, where scoring each query word includes calculating a dot product between a set of weights for that word and a representation of the audio file with a particular sparse feature vector.

17. The computer storage medium of claim 11, where the auditory model is a cochlear model that mimics the behavior of a cochlea.

18. The computer storage medium of claim 11, where the auditory image is a stabilized auditory image.

19. The computer storage medium of claim 11, where the auditory image is an auditory correlogram.

20. A non-transitory computer storage medium encoded with a computer program, the program comprising instructions that when executed by data processing apparatus cause the data processing apparatus to perform operations comprising:
receiving a text query, the query including one or more query terms;
retrieving a matching function that relates keywords and sparse feature vectors, each sparse feature vector being derived from a particular audio file, wherein each sparse feature vector is generated using sparse features extracted from a plurality of audio images, and wherein the sparse features represent abstract local structural properties of the auditory image;
identifying one or more keywords from the query terms;
identifying one or more audio files responsive to the query using the matching function; and
presenting search results identifying the one or more audio files.

21. A system comprising:
one or more computers configured to perform operations including:
generating a collection of auditory images including a plurality of audio images from each of a plurality of audio files, each auditory image being generated from respective audio files according to an auditory model;
for each audio file, extracting sparse features from each auditory image generated for the audio file to generate a sparse feature vector representing the audio file, wherein extracting sparse features from each auditory image comprises:
dividing the auditory image into multiple sub-images,
applying a feature extractor to each sub-image to generate corresponding local sparse codes, and
combining the sparse codes from each sub-image to form a sparse vector for the auditory image; and
ranking the audio files in response to a query including one or more words using the sparse feature vectors and a matching function relating sparse feature vectors to words in the query.

22. The system of claim 21, where the matching function is generated using a training collection of annotated audio files, and where generating the matching function includes:
receiving the collection of annotated audio files, each annotated audio file having an auditory image and one or more keywords associated with the content of the audio file;
generating a sparse feature vector for each audio file in the collection; and
training the matching function using the sparse feature vectors and the one or more keywords for the collection of annotated audio files to determine a matrix of weights matching sparse features and keywords.

23. The system of claim 21, further configured to perform operations comprising:

training the matching function using a passive-aggressive model using extracted audio features.

24. The system of claim 23, where the training learns a matrix W representing a mapping between spars features and keywords such that $F_W(q_k,a_k^+) > F_W(q_k,a_k^-)$ for all k.

25. The system of claim 21, where ranking the audio files further comprises:
scoring each query word relative to each sparse feature vector and combining the scores across words to rank audio files relative to the query.

26. The system of claim 25, where scoring each query word includes calculating a dot product between a set of weights for that word and a representation of the audio file with a particular sparse feature vector.

27. The system of claim 21, where the auditory model is a cochlear model that mimics the behavior of a cochlea.

28. The system of claim 21, where the auditory image is a stabilized auditory image.

29. The system of claim 21, where the auditory image is an auditory correlogram.

30. A system comprising:
one or more computers configured to perform operations including:
receiving a text query, the query including one or more query terms;
retrieving a matching function that relates keywords and sparse feature vectors, each sparse feature vector being derived from a particular audio file, wherein each sparse feature vector is generated using sparse features extracted from a plurality of audio images, and wherein the sparse features represent abstract local structural properties of the auditory image;
identifying one or more keywords from the query terms;
identifying one or more audio files responsive to the query using the matching function; and
presenting search results identifying the one or more audio files.

* * * * *

UNITED STATES PATENT AND TRADEMARK OFFICE
CERTIFICATE OF CORRECTION

| | | |
|---|---|---|
| PATENT NO. | : 8,463,719 B2 | Page 1 of 1 |
| APPLICATION NO. | : 12/722437 | |
| DATED | : June 11, 2013 | |
| INVENTOR(S) | : Richard F. Lyon et al. | |

It is certified that error appears in the above-identified patent and that said Letters Patent is hereby corrected as shown below:

In the Claims

In Claim 4, column 14, line 51, delete "spars" and insert -- sparse --.

In Claim 14, column 15, line 61, delete "spars" and insert -- sparse --.

In Claim 24, column 17, line 4, delete "spars" and insert -- sparse --.

Signed and Sealed this
Fifteenth Day of April, 2014

Michelle K. Lee
*Deputy Director of the United States Patent and Trademark Office*